(12) United States Patent
Sumanaweera et al.

(10) Patent No.: US 7,764,818 B2
(45) Date of Patent: Jul. 27, 2010

(54) SURFACE PARAMETER ADAPTIVE ULTRASOUND IMAGE PROCESSING

(75) Inventors: Thilaka S. Sumanaweera, Los Altos, CA (US); Kutay F. Ustuner, Mountain View, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1298 days.

(21) Appl. No.: 11/157,412

(22) Filed: Jun. 20, 2005

(65) Prior Publication Data

US 2007/0014446 A1    Jan. 18, 2007

(51) Int. Cl.
    G06K 9/00    (2006.01)
(52) U.S. Cl. ........................................ 382/131
(58) Field of Classification Search ........................ None
    See application file for complete search history.

(56) References Cited

U.S. PATENT DOCUMENTS

| | | | |
|---|---|---|---|
| 5,793,375 A * | 8/1998 | Tanaka | 345/426 |
| 5,797,844 A * | 8/1998 | Yoshioka et al. | 600/442 |
| 6,179,780 B1 | 1/2001 | Hossack et al. | |
| 6,429,861 B1 | 8/2002 | Hossack et al. | |
| 6,443,894 B1 | 9/2002 | Sumanaweera et al. | |
| 6,579,238 B1 | 6/2003 | Simopoulos et al. | |
| 6,852,081 B2 | 2/2005 | Sumanaweera et al. | |
| 2004/0165766 A1 * | 8/2004 | Goto | 382/154 |
| 2004/0181151 A1 | 9/2004 | Sumanaweera et al. | |
| 2005/0043619 A1 | 2/2005 | Sumanaweera et al. | |
| 2005/0093859 A1 | 5/2005 | Sumanaweera et al. | |
| 2005/0122333 A1 | 6/2005 | Sumanaweera et al. | |
| 2006/0241459 A1 * | 10/2006 | Tai | 600/454 |

OTHER PUBLICATIONS

"Real Time Volume Graphics," by Engel et al.; ACM Siggraph 2004; http://www200.pair.com/acade/tss/28.pdf; printed on Jun. 16, 2005; pp. 1-266.
U.S. Appl. No. 10/870,092, filed Jun. 16, 2004.

* cited by examiner

Primary Examiner—Charles Kim

(57) ABSTRACT

The depth buffer of a GPU is used to derive a surface normal or other surface parameter, avoiding or limiting computation of spatial gradients in 3D data sets and extra loading of data into the GPU. The surface parameter is used: to add shading with lighting to volume renderings of ultrasound data in real time, to angle correct velocity estimates, to adapt filtering or to correct for insonifying-angle dependent gain and compression. For border detection and segmentation, intersections with a volume oriented as a function of target structure, such as cylinders oriented relative to a vessel, are used for rendering. The intersections identify data for loading into the frame buffer for rendering.

15 Claims, 2 Drawing Sheets

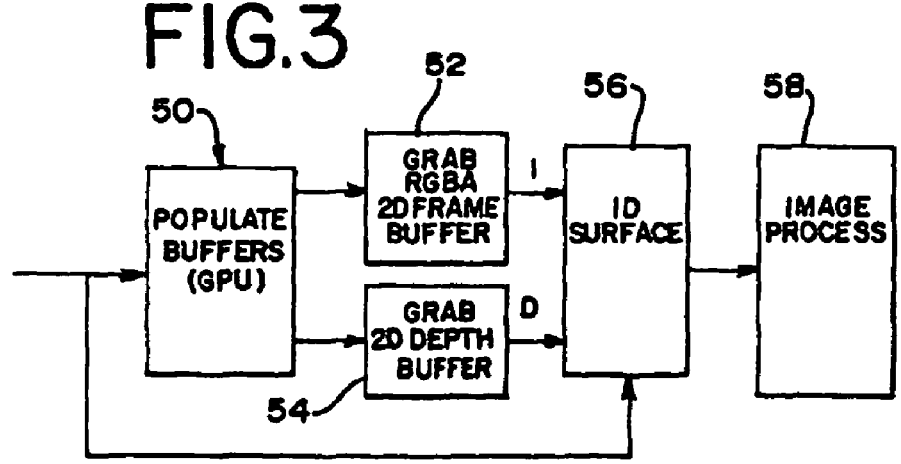
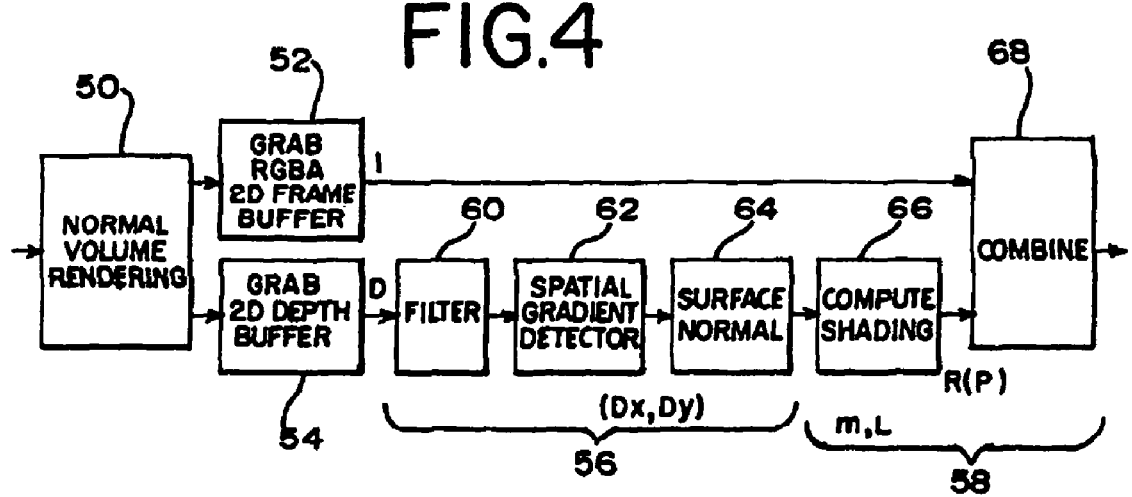
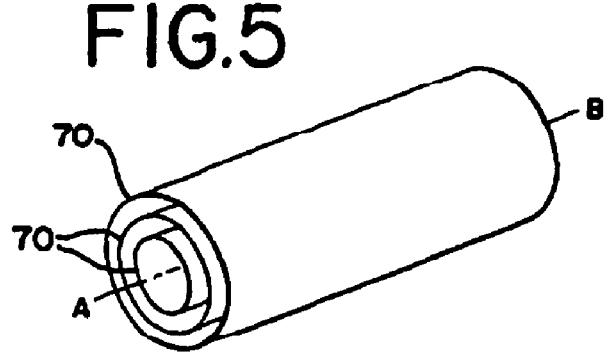

US 7,764,818 B2

SURFACE PARAMETER ADAPTIVE ULTRASOUND IMAGE PROCESSING

BACKGROUND

The present disclosure relates to processing ultrasound data. In particular, the processing adapts as a function of one or more surface parameters.

Surface parameters include a normal or other characteristic of a three dimensional surface. Shading is a common way to visualize subtle details of surfaces of an object. In the Lambertian shading model, the surface normal at a point on the surface is the unit vector n, and there is a light source along the unit vector, m. If the intensity of the light source is L, the diffused light reflected by the point, p, on the surface is:

$$R(p) = Ln \cdot m \qquad (1)$$

An image of the surface illuminated by the light source is provided with highlights. During volume rendering, R(p) is added to the luminance-mapped data value computed at a ray location, resulting in a volume rendered image with shading. Such images give a more realistic feel to the 3D representation, especially in the case of a baby's face.

Shaded surface displays have been provided on ultrasound systems. To compute the normal, the voxel-by-voxel intensity gradients are computed along range, azimuth and elevation directions: [Gx, Gy, Gz]. The vector, n, is computed in the acoustic domain by normalizing [Gx, Gy, Gz]. These computations are performed after beamforming and before scan conversion, such as with a central processing unit (CPU). One of the difficulties in generating a shaded surface display of volumetric ultrasound data is the shear amount of computation for the normal, n. Since Gx, Gy and Gz, each represents a separate data volume, the computationally intensive calculations are preformed for three times more data than mere processing a single data set for a volume. The CPU or other device may have limited bandwidth, such as due to processing of other critical tasks. Data transfer may be limited, reducing the likelihood of real time three dimensional imaging.

Other than shading, surface information has been used for angle compensation of Doppler velocity estimates. The surface is used as an indication of flow direction. Adaptive filtering techniques for 2D imaging based on local differential properties of anatomical structures for improving the detectability and image aesthetics have been performed a CPU or specialized hardware. Borders of anatomical structures, such as vessels, the ventricle or baby faces, are detected and segmented. Border detection and segmentation are performed by the CPU, typically at non-real time rates.

BRIEF SUMMARY

By way of introduction, the preferred embodiments described below include methods, systems and computer readable media for processing ultrasound data as a function of a surface. A surface is identified using a graphics processing unit or CPU. For example, a surface normal is derived from a 2D depth buffer of a GPU, avoiding or limiting computation of spatial gradients in 3D data sets and extra loading of data into the GPU. The surface information is used for further ultrasound image processing, such as: to add shading with lighting to volume renderings of ultrasound data in real time, to angle correct velocity estimates, to adapt filtering or to correct for insonifying-angle dependent gain and compression.

In another embodiment, intersections with a volume are oriented as a function of target structure, such as cylinders oriented relative to a vessel, for rendering. The intersections identify data for loading into the frame buffer for rendering.

In a first aspect, a method is provided for processing ultrasound data as a function of a surface. Coordinates are written to a depth buffer of a graphics processing unit as a function of first ultrasound data. Second ultrasound data is processed as a function of data from the depth buffer. The first ultrasound data is the same or different than the second ultrasound data.

In a second aspect, a method is provided for processing ultrasound data as a function of a surface. A surface of a specular target is identified. An orientation of the surface relative to an insonification angle is determined. An M- or B-mode imaging parameter is varied as a function of the orientation.

In a third aspect, a method is provided for processing ultrasound data. Ultrasound data associated with a series of substantially parallel surfaces corresponding generally to a target surface are identified. Rendering is performed as a function of the identified ultrasound data.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 3 is a flow chart diagram of one embodiment of a method for processing ultrasound data as a function of a surface;

FIG. 4 is a flow chart diagram of one embodiment of a method for volume rendering with shading; and FIG. 5 is a graphical representation of one embodiment of surfaces oriented relative to target structure for rendering or determining a border.

DETAILED DESCRIPTION OF THE DRAWINGS AND PRESENTLY PREFERRED EMBODIMENTS

A graphics processing unit (GPU) is used to identify surface parameters, such as surface coordinates, surface normal, principal curvature directions, and/or Gaussian curvature. The surface parameters are used for image processing. Potential applications include: adding shading with light sources to volume renderings of ultrasonic data at real time rates using deferred shading, automatic detection of the tissue angle relative to the insonification angle and velocity estimate or intensity correction at real time rates, quantifying vessel stiffness, ventricular volume and/or ejection fraction measurements in real time, automatically segmenting target structure from a 3D volume, and/or improving detectability and image aesthetics of specular targets such as heart valves, membranes, capsules, tendons, or fetal skin by using surface parameter dependent filtering, such as smoothing along the surface tangent planes or whitening along the surface normal. Whether detected by a GPU or a CPU, surface parameters may be used for specular target deshading. Detectability and image aesthetics of specular targets are improved by using surface parameter dependent gain compensation.

Some embodiments use a GPU, a CPU or both a CPU and GPU. For real-time rendering rates, a depth buffer of the GPU is used to determine surface parameters. The discussion below describes a system 10 with a GPU, but alternative or additional use of a CPU may be provided. Different uses of surface information from either a GPU or CPU are then discussed.

Figure 1:
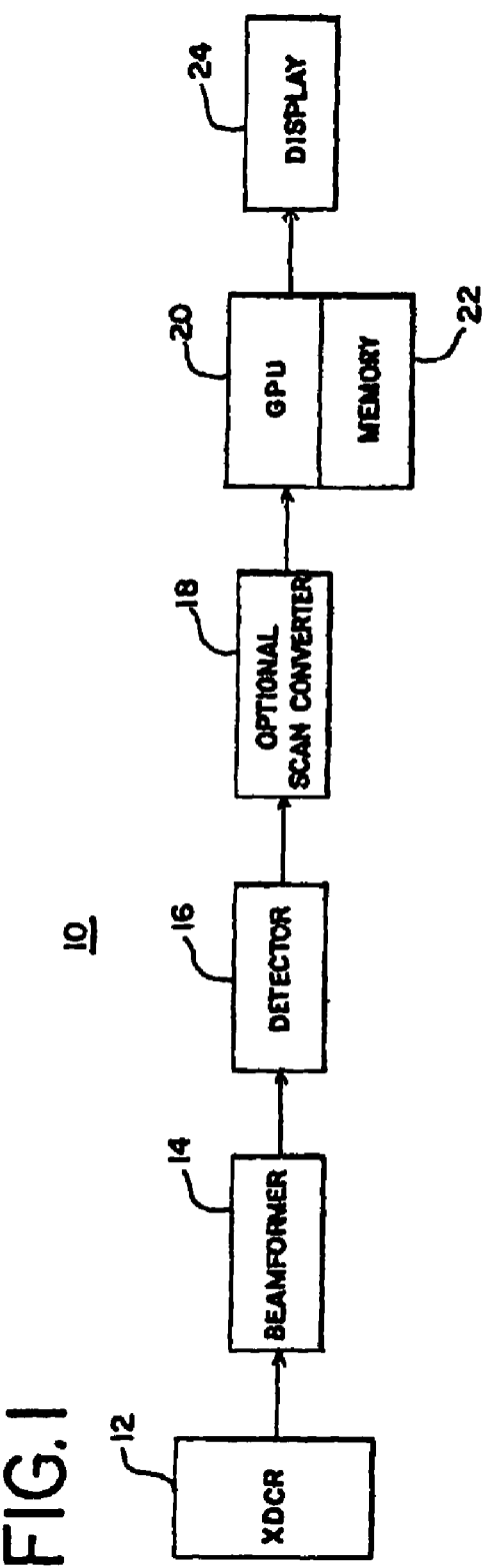
FIG. 1 is a block diagram of one embodiment of an ultrasound system for processing ultrasound data as a function of a surface.

FIG. 1 shows the ultrasound system 10 for determining surface information. The ultrasound system 10 includes a transducer 12, a beamformer 14, a detector 16, an optional scan converter 18, a GPU 20 with a memory 22, and a display 24. Additional, different or fewer components may be provided. For example, the GPU 20 is replaced with a CPU or a CPU is provided within or with access to the processing path including the GPU 20. The CPU configures the system 10, determines a surface parameter, processes ultrasound data based on surface parameters or performs other functions. In an alternative embodiment, the system 10 is a workstation or computer operable on ultrasound data obtained with another device. In alternative embodiments, the system 10 is a MRI, CT, positron emission tomography (PET) or other medical system for scanning a volume of a patient in any format.

The transducer 12 comprises a 1, 1.25, 1.5, 1.75, or two-dimensional array of elements. The array of elements is configured for linear, curvilinear, sector, Vector®, or other imaging configurations. Electrical and/or mechanical steering is provided. The beamformer 14 connects with the transducer 12 for generating acoustic beams along an acoustic grid. For example, a polar coordinate format is used in a two-dimensional plane or a three-dimensional volume to acquire signals representing range samples along scan lines. The acoustic data is collected by rocking, rotating, or sliding the transducers with mechanical movement or using electronic beam steering. In alternative embodiments, a cylindrical grid, Cartesian grid, hexagonal grid or other coordinate system is used. Where the sampling is along a Cartesian grid, such as using a linear array, the sampling is likely on a larger scale or with a different resolution than the display Cartesian grid. As a result, scan conversion is typically performed on such data, but may be minimized or eliminated using the processes described herein.

The detector 16 comprises a B-mode, Doppler, flow and/or other detector for identifying intensity, energy, velocity or other information from the beamformer signals.

The optional scan converter 18 converts from the acoustic grid to a Cartesian coordinate grid, such as associated with the display 24. Where a three-dimensional representation is rendered from data free of formatting along a Cartesian coordinate, the scan converter 18 is skipped, not provided, or turned off. In embodiments where some data is formatted in a Cartesian coordinate system, the scan converter 18 converts some data from the acoustic grid to the Cartesian coordinate grid. For example, the scan-converter 18 scan-converts a plurality of two-dimensional images or planes from an acoustic grid to a Cartesian coordinate grid. Alternatively, the scan converter 18, CPU, GPU or other processor converts some or all of the acoustic grid data, such as converting all of the data to a 3D Cartesian grid.

The memory 22 comprises a video random access memory, a random access memory, a removable media (e.g. diskette or compact disc) or other memory device for storing data or video information. In one embodiment, the memory 22 comprises a video random access memory of the graphics processing unit 20. In alternative embodiments, the memory 22 is separate from the GPU 20, such as a cache memory of a processor, the system memory or other memory. The memory 22 is operable to store ultrasound data formatted in an acoustic grid, a Cartesian grid, both a Cartesian coordinate grid and an acoustic grid, or ultrasound data representing a volume in a 3D grid.

The GPU 20 is a graphics accelerator chip, processor, applications specific integrated circuit, circuit, or accelerator card. In one embodiment, the GPU 20 is a personal computer graphics accelerator card or components, such as manufactured by nVidia (e.g. Quadro4 900XGL or others), ATI (e.g. Radeon 9700 or others), or Matrox (e.g. Parhelia or others). The GPU 20 provides hardware devices for accelerating the volume rendering processes, such as using application programming interfaces for three-dimensional texture mapping. Example APIs include OpenGL and DirectX, but other APIs may be used independent of or with the GPU 20. The GPU 20 is operable to texture map with alpha testing or other volume rendering of the ultrasound data based on a spatial relationship of an intersection relative to the viewing direction with an acoustic grid or data space.

The GPU 20 and/or the memory 22 are included within the system as part of a single ultrasound system component, such as an ultrasound system on a cart in a same housing. In alternative embodiments, the GPU 20 and memory 22 are provided separate from an ultrasound data acquisition system, such as provided in a workstation or personal computer. The ultrasound data is transferred wirelessly, over a computer network or through a transferable storage medium to the GPU 20.

The display 24 is a CRT, LCD, flat panel, plasma screen, video projector or other device for displaying a two-dimensional representation of a three-dimensional volume. For example, the display 24 is a color display, but monochrome displays may be used.

Figure 2:
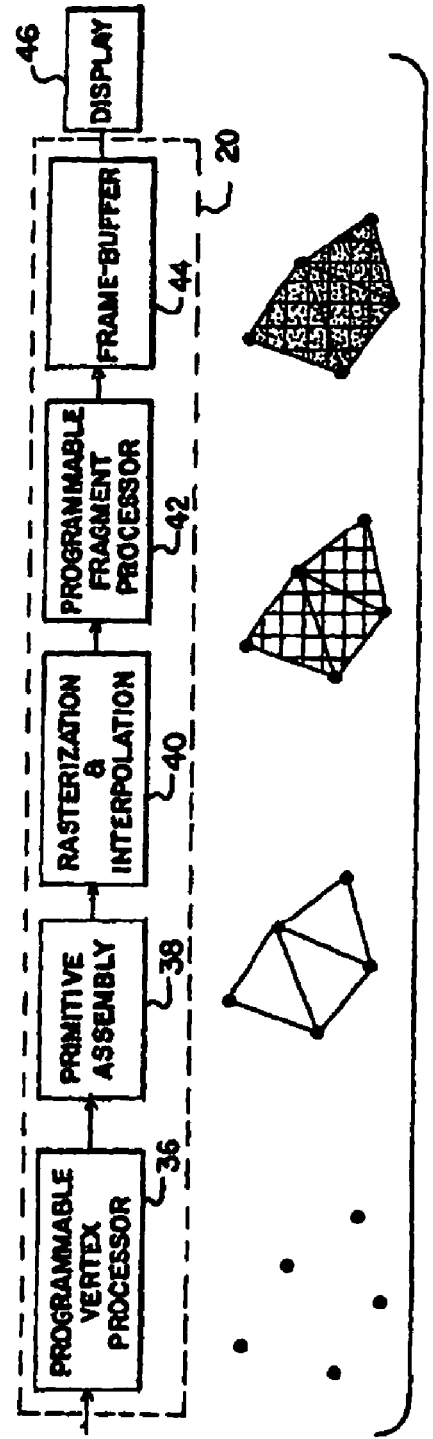
FIG. 2 is a block diagram of one embodiment of a graphics processing unit.

FIG. 2 shows the graphics processing pipeline standardized by APIs such as OpenGL and DirectX. Other now known or later developed pipelines may be used. The GPU 20 includes one or more programmable vertex processors 36 (e.g., 1-4 vertex processors), a primitive assembly 38, a rasterization and interpolation block 40, one or more programmable fragment processors 42 (e.g., 1-4 fragment processors) and a frame-buffer 44. The vertex processor 36 maps attributes of the incoming vertex into a new set of values. This mapping is for all or some of the attributes. The mapping is a linear transformation or a more complex type of mapping. The output of the vertex processor 36 is a set of attributes for each vertex.

These vertices are fed into the primitive assembly 38. The vertices are grouped together to form points, lines and triangles. These primitives are then fed into the rasterization and interpolation stage 40. This stage rasterizes each primitive, such as points, lines and triangles, into a set of fragments. A fragment is a pixel with an associated depth and is located on a primitive. The fragments have attributes such as color, coordinates and texture coordinates, etc.

The programmable fragment processor 42 takes in these fragments, applies various processes on them, creates pixels and writes data into the frame-buffer 44. The frame buffer 44 is a memory, buffer or other device for receiving the pixels from the fragment processor 42 for display on the display 46. Alpha or other blending is performed from the frame buffer 44 by reading back the currently blended data for blending with other ultrasound data. The frame buffer 44 includes different sections, such as color or luminance buffer for storing composited ultrasound data, a stencil buffer and a depth buffer for storing coordinates of a value exceeding a threshold nearest to the viewer relative to the viewing direction.

Other now known or later developed structures and processes may be used in the graphics pipeline for graphics rendering. The blocks shown in FIG. 2 are high level blocks. Each block contains many other finer processing stages. For example, the rasterization and interpolation stage 40 can contain such operations such as Scissor Test, Alpha Test, Stencil Test, Depth Test, or others. The GPU 20, vertex processor 36 and/or the fragment processor 42 are programmable to perform volume rendering or other image processing, such as filtering a two dimensional image. A feed back within the GPU 20 pipeline or the system 10 data path may be provided for image processing by or as a function of data output by the GPU 20.

The GPU 20 is operable to receive graphics data and generate a display on the display 46 from the graphics data. The process is performed pursuant to an application programming interface, such as GDI, GDI+, DirectX, OpenGL, or other APIs now know or later developed. Additionally or alternatively, the GPU 20 is used to process ultrasound data for other purposes. For example, in-phase and quadrature data, post detection data, log compressed data, scan converted or any other ultrasonic data is input to the GPU 20. Using the programmable vertex processor 36 and/or the fragment processor 42, the ultrasound data is processed. OpenGL, DirectX extensions or other programming languages, such as Cg shader language, program the GPU 20 to process ultrasound data. HLSL, Stanford's high-level shader language or other now known or later developed shader languages may also be used. Some resource intensive computations are performed by the GPU 20 rather than another processor, such as a CPU, DSP, ASIC or FPGA. Since the GPU 20 functions as a computational engine, one or more additional outputs are provided. For example, an output is provided downstream of the programmable vertex processor 36 but upstream of the fragment processor 42. As an alternative or additional output, an output is provided after the fragment processor 42. Alternatively, the output from the frame buffer is used.

FIG. 3 shows a block diagram of a method for processing ultrasound data as a function of a surface. The method uses a GPU for determining surface parameters. In an alternative embodiment, such as for specular target deshading, the determination of surface parameters or other image processing is performed with a CPU or GPU.

In act 50, ultrasound data is processed to populate a frame buffer. For example, frames of data representing different intersections with a volume are composited in the frame buffer. The ultrasound data are sent to the GPU for processing.

In act 52, ultrasound data values are written to the frame buffer. Data associated with a plurality of intersections with the volume are selected for compositing. The intersections are parallel planes, spherical surfaces or other surfaces. For example, a plurality of parallel planes orthogonal to a viewing direction is used for selecting data for rendering. When volume rendering with the alpha test enabled, the GPU writes all the voxels greater than some threshold, T, to the frame buffer. The voxels or ultrasound data values along a same viewing ray are composited, such as by alpha blending, selection of the maximum or selection of the minimum. For image processing other than volume rendering, other selection criteria for populating the frame buffer may be used.

In act 54, the depth buffer is populated. As the frame buffer is populated, ultrasound data associated with a series of substantially parallel surfaces is examined. If the ultrasound data associated with a given pixel or location in the depth buffer is closer to the viewer and above a threshold, the depth or coordinate of the data is written to the depth buffer. The closer depth overwrites data along the same ray line but at a deeper depth. Each pixel in the depth buffer is a number or coordinate of the depth of the pixel in the screen coordinate system. For data representing a volume, the populated depth buffer contains the distances of the voxels larger than T and closest to the screen. One depth value is provided for each 2D location in the depth buffer. The depth buffer contains the (x, y, z) screen-coordinates of the iso-surface corresponding to the iso-value T. The 2D depth buffer indicates a surface associated with the closest values to a viewer that are above a threshold.

In one embodiment, the rendering is based on intersections arranged relative to a target structure or likely surface rather than parallel planes orthogonal to the viewing direction. The depth buffer is populated with the coordinates of data closest to a center of the target surface and greater than a threshold.

In act 56, a surface parameter is identified. Act 56 is performed with the GPU and/or a CPU. For example, the frame buffer content, I, and the depth buffer content, D, are read back to the GPU or to the CPU for further processing. The result of the processing is then output for further image processing.

Where ultrasound data is used, the surface of a specular target is identified. For example, the target is a vessel, heart, organ, face of a fetus, or other tissue. The tissue extends along a three-dimensional surface.

Surface information is derived from the data from the depth buffer. The coordinates or depths stored for a given viewing direction are processed or read back. Any one or more surface parameters are detected. For each or selected spatial locations in the depth buffer, a surface normal, surface tangent, surface coordinates, principal curvature direction (major or minor), Gaussian curvature, combinations thereof or other surface parameter are detected. Other surface information includes an orientation of the surface relative to an insonification angle. For example, the difference between a surface normal vector and an insonification angle is calculated.

In act 58, image processing is performed as a function of the surface parameter. Act 58 is performed with the GPU and/or a CPU. For example, the surface parameters are provided to the GPU or to the CPU for further processing of the same ultrasound data used to determine the surface parameter or subsequently acquired ultrasound data. The result of the image processing is then output for display, storage or transmission.

The image processing is performed as a function of data from the depth buffer, such as image processing based on a surface parameter or relationship of a surface parameter to an insonification angle. Any now known or later developed image processes may be performed based on the surface parameters. By using the depth buffer to determine the surface parameters, the image processing is more likely performed as a real-time image process, allowing two or three dimensional imaging that includes target surface adaptations.

In one image process, the surface parameters are used for shading the ultrasound data of a three dimensional representation. FIG. 4 shows a flow chart for shading. The ultrasound data, such as data in an acoustic domain with about one byte per voxel, is transferred to the GPU for volume rendering in act 50. As represented by act 52, the ultrasound data is volume rendered to the frame buffer, resulting in a 2D RGB (color or luminance) or gray scale image, I, containing the volume rendered data. The volume rendering uses any now known or later developed compositing technique, such as alpha blending for providing RGBA data. The alpha test is enabled, compositing only ray sample values that are larger than a small threshold, T, into the frame buffer.

In act 54, the rendering is performed with the depth buffer enabled. Once the volume rendering is complete, the video RAM hosting the depth buffer includes a 2D depth image, D, containing the depth values of each pixel in I.

In act 56, the surface parameters for each or some spatial locations in the 2D depth buffer are determined. Act 56 includes acts 60, 62 and 64, but more or fewer acts may be included. In act 60, a smoothing filter is applied to the data in the depth buffer. The smoothing filter is a one or two dimensional spatial filter to filter out wood-ring-like structures in the depth data due to finite ray sampling. For example, the filter is a box car or Gaussian filter. In one embodiment, the filtering is performed by passing the data in the depth buffer back through the GPU data path. Alternatively, no filtering is provided.

In act 62, the 2D spatial gradients [Dx, Dy] of the data in the depth buffer are computed. The spatial gradients are determined using any now known or later developed approach, such as computing a central difference. Any size sampling window for computing the spatial gradients may be used, such as a 2, 3 or greater number of pixels in a symmetrical or asymmetrical sampling window. In act 64, the 3D surface normal is computed for each spatial location of the 2D depth buffer. The surface normal is given by: n=[Dx Dy 1.0]/sqrt $(1.0+Dx^2+Dy^2)$, but other equations may be used. The determination of the spatial gradients and normal vector are performed in yet another pass through the GPU in one embodiment. Alternatively, the filtering, gradient determination and normal calculation are performed in one pass though the GPU or by a processor not in the GPU.

In act 66, image processing is provided, in part, by determining a shading component for each spatial location in the frame buffer. Using the normal, n, a fixed light source vector, m, and a light intensity, L, the amount of diffused light is determined using Equation 1. Other lighting or shading models may be used. In act 68, additional image processing is provided by combining the shading component with the image data. The reflected light component, R(P), is summed with the 2D image I. The combination is linear, such as summation, but other combinations may be used. Acts 66 and 68 are performed with yet another pass through the GPU in one embodiment.

In alternative embodiments, any of acts 60, 62, or 64 are performed differently or not used. In another alternative or additional embodiment, the filtering of act 60 is performed after computing shading. The shading components are spatially filtered. Any quantization artifacts arising from the finite depth sampling and finite computing precision in the GPU are smoothed or reduced.

Referring again to FIG. 3, in another image process of act 58, velocity estimates are angle corrected as a function of the data from the depth buffer. The directions of the insonifying beams are known in a reference coordinate system of the transducer. Once the surface coordinates are extracted from the depth buffer, the orientation of a vessel is estimated in the screen coordinates. For example, a longest dimension of an identified surface or a best match of a cylinder to the surface is determined as a direction of flow. Since the transformation between the screen coordinates and the probe coordinates are known, the Doppler velocity measured by the insonifying beams is corrected, such as by multiplying the estimate by the cosine of the difference between the insonifying beam angle and the flow angle. The velocity estimates are angle corrected by a detector, the CPU or the GPU. For example, velocity estimates for an ongoing sequence of two dimensional scans of a same area are sequentially loaded into the GPU. Based on a previously identified flow direction, each of the velocity estimates within the surface is angle corrected within the GPU.

In yet another image process of act 58, ultrasound data is filtered as a function of the surface or surface parameters, such as the surface derivatives, surface normal, principle (minimum or maximum) curvature directions, or Gaussian curvature. The ultrasound data is enhanced by performing adaptive algorithms based on the surface properties. Smoothing, such as low pass filtering, along the surface tangent planes, whitening along the surface normal or other filtering applied differently along the surface than elsewhere is performed by the GPU or other processor. Detectability and image aesthetics of specular targets, such as heart valves, membranes, capsules, tendons, fetal skin, or other tissues, are improved by using surface parameter dependent filtering.

In another image process of act 58, specular target deshading is performed as a function of the surface. The direction of the insonifying beam is known in a reference coordinate system of the transducer. Once the surface normal is computed, the surface normal is transformed to the probe coordinate system or the direction of the insonifying beam is transformed to the display coordinate system. M- or B-mode imaging parameters, such as an intensity or brightness, is varied as a function of an orientation of the insonifying angle to a surface normal. For example, the intensity value or brightness is multiplied by the cosine of the difference between the insonifying angle and the surface normal. The dot product between the insonifying angle vector and the surface normal vector provides the amplification of the B-mode data to correct for differences in reflectivity incident on the transducer due to the surface direction. The variation corrects gain as a function of orientation. Compression or both gain and compression may be corrected. The correction is provided for two dimensional scans or for volume-rendered images, generating an insonification angle dependent gain corrected image as a function of the varied M- or B-mode imaging parameter.

In another image process of act 58, a border is identified as a function of the coordinates in the depth buffer or the surface. The surface provided by the data in the depth buffer indicates a border. Further image processing is provided by displaying the border, rendering an image from the border, highlighting the border or using the border for further calculations. For example, the border corresponds to a vessel, heart chamber, or other structure. The volume flow associated with the border is calculated.

The intersections used for rendering to identify the surface are parallel planes or spherical sections based on the viewing direction or transducer scan format. In another method for processing ultrasound data, a target surface or border may be more accurately detected or segmented using different intersections with the volume. The borders of structures in 2D or 3D images are extracted using the data in the depth buffer based on intersections established as a function of the target structure.

FIG. 5 shows surfaces 70 of intersections through a volume positioned relative to a target surface. A location associated with the target surface is identified. In FIG. 5, the target surface is a vessel or other tube shaped structure. The axis AB of the target structure is automatically detected by using Doppler signals with a maximum flow velocity, such as medial axis detection, or detected by manual placement. The location of the target surface, such as the axis AB, does not have to be the exact axis. Other locations on, in or near the target surface may be used. The location may be a point, a plurality of points, a curved or straight line, a plurality of lines, a volume, a region, an area or other shape.

Ultrasound data associated with the series of substantially parallel surfaces 70 corresponding generally to the target surface is identified. Substantially parallel is used to account for data sampling differences. Based on the location, non-planar, non-spherical or other surfaces are nested around the likely target surface. FIG. 5 shows a plurality of nested cylinders where a smallest cylinder is likely within the target surface and a largest cylinder is likely outside of the target surface. A plurality of ellipsoidal, spherical, spline, curvilinear, or superquadric surfaces may also be used in a nested or front-to-back arrangement. For example, ventricle walls are detected by placing the set of ellipsoidal surfaces 70 or other surfaces 70 modeled on the ventricle wall. Surfaces 70 modeling a general shape of other structures, such as a baby face, may be used.

The series of substantially parallel surfaces 70 are oriented around the location. For example, the cylinder surfaces 70 are positioned relative to the actual structure or location (e.g., axis AB) such that the actual or target vessel surface is likely between the smallest and the largest surface 70 in the set. To detect the vessel wall, the data is peeled from the object in these concentric tubes. If the axis of the vessel is tortuous, the axis of the cylindrical surfaces 70 also roughly follows the axis of the vessel. For other structures, such as the ventricle or baby face, the surfaces 70 are positioned to be in front of and behind the location. The surfaces 70 are associated with ultrasound data to be used for rendering.

Once the surfaces 70 are positioned relative to the target structure, the GPU or CPU renders a series of rectangles from back to front on the screen. The ultrasound data associated with a surface 70 is selected using interpolation or a nearest neighbor. The rendering is performed as a function of the identified ultrasound data. The ultrasound data for each of the substantially parallel surfaces is composited, such as with alpha blending, maximum intensity projection or minimum intensity projection.

Each rectangle for rendering corresponds to the ultrasound data from one of the surfaces 70, such as one of the concentric tubes, in the data set. The ultrasound data for each of the substantially parallel surfaces 70 is rendered as a two-dimensional frame of data with a largest or furthest of the substantially parallel surfaces 70 initially composited and a smallest or closest of the substantially parallel surfaces 70 lastly composited. A series of rectangles are rendered from back-to-front relative to the screen with alpha test enabled and depth buffer enabled. The ultrasound data is rendered sequentially from different surfaces 70. In the example of FIG. 5, the farthest rectangle rendered contains the data from the largest concentric cylinder surface 70. The rectangle closest to the eye contains the data from the smallest concentric cylinder surface 70. The vessel wall is assumed to lie between the largest and the smallest cylinder surfaces 70. The data from the largest surface is mapped to the rectangle furthest from the screen. The data from the smallest surface is mapped to the rectangle closest to the screen.

During rendering, coordinates are written to the depth buffer of the graphics processing unit. The coordinates are associated with the ultrasound data for the substantially parallel surfaces 70. Once rendering is complete, the depth buffer includes the cylindrical coordinates $(x, \theta, r)$ of the interior vessel wall, where x is the arc distance along the axis of the surfaces 70, $\theta$ is the angular coordinate and r is the radial coordinate. For other surfaces 70, such as surfaces 70 modeling a likely ventricle surface or baby face, the depth buffer includes the coordinates of the target surface, such as the ventricle surface, in the coordinate system of the surfaces 70. The target surface is identified as a function of data in the depth buffer based on the intersections oriented relative to the target surface. Different target surfaces may be identified by rendering in a different order, such as identifying an exterior surface of a vessel by rendering from the smallest surface 70 to the largest surface 70.

The instructions for implementing the processes, methods and/or techniques discussed above are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, filmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for processing ultrasound data as a function of a surface, the method comprising:
    writing to a depth buffer of a graphics processing unit as a function of first ultrasound data, the first ultrasound data representing samples in a volume of a patient;
    processing second ultrasound data as a function of data from the depth buffer, the data of the depth buffer indicating the surface, the first ultrasound data being the same or different than the second ultrasound data;
    generating an image as a function of the processed, second ultrasound data; and
    identifying the surface from the data from the depth buffer and determining an orientation of the surface relative to an insonification angle, and wherein processing comprises varying an M- or B-mode imaging parameter as a function of a cosine of difference of the insonification angle and the orientation.

2. The method of claim 1 wherein writing to the depth buffer comprises identifying coordinates of first ultrasound data closest to a viewer and greater than a threshold.

3. The method of claim 1 further comprising:
    detecting a surface parameter from the data from the depth buffer;
    wherein processing the second ultrasound data comprises processing as a function of the surface parameter.

4. The method of claim 3 wherein detecting the surface parameter comprises detecting a surface normal, surface coordinates, principal curvature direction, Gaussian curvature or combinations thereof.

5. The method of claim 1 further comprising deriving surface information from the data from the depth buffer, and wherein processing comprises shading the second ultrasound data as a function of the surface information.

6. The method of claim 1 wherein processing comprises angle correcting velocity estimates as a function of the data from the depth buffer.

7. The method of claim 1 wherein writing comprises identifying first ultrasound data associated with a series of substantially parallel surfaces corresponding generally to a target surface and writing coordinates of the first ultrasound data closest to a center of the target surface and greater than a threshold, and wherein processing comprises identifying a border as a function of the coordinates.

8. The method of claim 1 further comprising identifying the surface from the data from the depth buffer, and wherein processing comprises filtering the second ultrasound data as a function of the surface.

9. The method of claim 1 wherein processing comprises processing with the graphics processing unit.

10. A method for processing ultrasound data as a function of a surface, the method comprising:
   identifying a surface of a specular target from data representing samples in a volume of a patient;
   determining an orientation of the surface relative to an insonification angle;
   varying an M- or B-mode imaging parameter as a function of a dot product between the insonification angle and the orientation; and
   generating an image as a function of the M- or B-mode imaging parameter.

11. The method of claim 10 wherein varying the M- or B-mode imaging parameter comprises correcting brightness as a function of the orientation.

12. The method of claim 10 wherein varying the M- or B-mode imaging parameter comprises correcting gain, compression or both gain and compression as a function of the orientation.

13. The method of claim 10 wherein identifying the surface comprises writing coordinates of first ultrasound data closest to a viewer and greater than a threshold to a depth buffer of a graphics processing unit as a function of first ultrasound data.

14. The method of claim 10 wherein determining the orientation comprises detecting a surface normal, surface coordinates, principal curvature direction, Gaussian curvature or combinations thereof.

15. The method of claim 10 further comprising:
   generating the image as an insonification angle dependent gain corrected image, the image generated as a function of the varied M- or B-mode imaging parameter.

* * * * *